(12) United States Patent
Tsai

(10) Patent No.: US 9,767,528 B2
(45) Date of Patent: Sep. 19, 2017

(54) VISUAL INTERFACE APPARATUS AND DATA TRANSMISSION SYSTEM

(75) Inventor: Hsiung-Kuang Tsai, Taipei (CN)

(73) Assignee: SLIM HMI TECHNOLOGY, Taipei (TW)

( * ) Notice: Subject to any disclaimer, the term of this patent is extended or adjusted under 35 U.S.C. 154(b) by 51 days.

(21) Appl. No.: 14/386,712

(22) PCT Filed: Mar. 21, 2012

(86) PCT No.: PCT/CN2012/072670
§ 371 (c)(1),
(2), (4) Date: Oct. 16, 2014

(87) PCT Pub. No.: WO2013/139001
PCT Pub. Date: Sep. 26, 2013

(65) Prior Publication Data
US 2015/0049100 A1    Feb. 19, 2015

(51) Int. Cl.
*H04B 1/38*    (2015.01)
*G06T 1/20*    (2006.01)
(Continued)

(52) U.S. Cl.
CPC ............. *G06T 1/20* (2013.01); *G06F 3/044* (2013.01); *G06F 3/046* (2013.01); *G06F 3/0412* (2013.01);
(Continued)

(58) Field of Classification Search
CPC ....................................................... G06T 1/20
(Continued)

(56) References Cited

U.S. PATENT DOCUMENTS 7,468,774 B2 * 12/2008 Sakama ................. G02F 1/13
345/206
8,365,238 B2 * 1/2013 Reznic ................... H04L 12/66
348/435.1
(Continued)

FOREIGN PATENT DOCUMENTS

CN    1493999    5/2004
CN    201054217 Y    4/2008
(Continued)

*Primary Examiner* — Barry Drennan
*Assistant Examiner* — Phong Nguyen
(74) *Attorney, Agent, or Firm* — Muncy, Geissler, Olds & Lowe, P.C.

(57) ABSTRACT

A data transmission system and a visual interface apparatus are disclosed in the invention. The visual interface apparatus works with the operation apparatus and includes a control module and an interface module configured with a display function. The interface module includes a driving unit and a display panel. The control module transmits a display data and a transmission data to the driving unit and, after receiving and processing, the driving unit transmits a screen data and a coupling data to the display panel. When the operation apparatus operates on the visual interface apparatus, at least a part of the coupling data is coupled to the operation apparatus from the display panel. The invention is capable of processing the data for display and the data for transmission and then sending them to the display panel of the visual interface apparatus. Thus, the visual interface apparatus in the invention can be used to display images and also transmit the data such as data or file to another electronic apparatus. Besides, by integrating the display data with the transmission data, the system design can be simplified so that a single connection port can be used.

18 Claims, 3 Drawing Sheets

(51) Int. Cl.
*G09F 9/00* (2006.01)
*G09G 5/18* (2006.01)
*G06F 3/147* (2006.01)
*G09G 5/12* (2006.01)
*G09G 3/20* (2006.01)
*G06F 3/041* (2006.01)
*G06F 3/044* (2006.01)
*G06F 3/046* (2006.01)
G09G 3/04 (2006.01)
G09G 3/3225 (2016.01)
G09G 3/36 (2006.01)

(52) U.S. Cl.
CPC ............. *G06F 3/147* (2013.01); *G09F 9/00* (2013.01); *G09G 3/20* (2013.01); *G09G 5/12* (2013.01); *G09G 5/18* (2013.01); G09G 3/04 (2013.01); G09G 3/3225 (2013.01); G09G 3/3648 (2013.01); G09G 2354/00 (2013.01); G09G 2370/06 (2013.01); G09G 2370/16 (2013.01)

(58) Field of Classification Search
USPC ............ 455/73, 82, 83, 121, 562.1, 575.7
See application file for complete search history.

(56) References Cited

U.S. PATENT DOCUMENTS

| | | | | |
|---|---|---|---|---|
| 2004/0125053 A1* | 7/2004 | Fujisawa | | G06F 1/1613 345/76 |
| 2004/0135758 A1* | 7/2004 | Morita | | G09G 3/20 345/98 |
| 2004/0183788 A1* | 9/2004 | Kurashima | | G06F 3/03547 345/173 |
| 2004/0189625 A1* | 9/2004 | Sato | | G06K 19/07749 345/204 |
| 2007/0216668 A1* | 9/2007 | Miyamoto | | G06F 3/147 345/204 |
| 2008/0280558 A1* | 11/2008 | Arunan | | H04W 28/06 455/41.1 |
| 2009/0167699 A1* | 7/2009 | Rosenblatt | | G06F 3/044 345/173 |
| 2010/0045635 A1* | 2/2010 | Soo | | G06F 3/046 345/178 |
| 2010/0073358 A1* | 3/2010 | Ozaki | | G09G 3/3233 345/214 |
| 2010/0085988 A1* | 4/2010 | Fukuda | | H04L 25/02 370/480 |
| 2010/0265203 A1* | 10/2010 | Rofougaran | | G06F 3/03545 345/174 |
| 2011/0227800 A1* | 9/2011 | Takahashi | | C09K 11/574 343/720 |
| 2011/0273382 A1* | 11/2011 | Yoo | | G06F 3/041 345/173 |
| 2011/0298590 A1* | 12/2011 | Lee | | G06K 7/0008 340/10.3 |
| 2011/0304583 A1* | 12/2011 | Kruglick | | G06F 3/044 345/174 |
| 2011/0314299 A1* | 12/2011 | Lee | | G06F 3/147 713/189 |
| 2012/0019419 A1* | 1/2012 | Prat | | H01Q 1/2266 343/702 |
| 2012/0133597 A1* | 5/2012 | Chen | | G06F 3/044 345/173 |
| 2012/0162032 A1* | 6/2012 | Yang | | H01Q 1/2266 343/720 |
| 2013/0196596 A1* | 8/2013 | Parekh | | G06F 1/1643 455/41.1 |
| 2014/0028619 A1* | 1/2014 | Huang | | H04B 1/3827 345/174 |
| 2015/0185048 A1* | 7/2015 | Liu | | G01D 5/20 345/174 |

FOREIGN PATENT DOCUMENTS

| | | |
|---|---|---|
| CN | 201117175 Y | 9/2008 |
| JP | H6-318136 A | 11/1994 |
| JP | 2004-127272 A | 4/2004 |
| JP | 2005301219 A | 10/2005 |
| TW | M423882 U | 3/2012 |
| WO | WO2011/155939 A1 | 12/2011 |

\* cited by examiner

VISUAL INTERFACE APPARATUS AND DATA TRANSMISSION SYSTEM

BACKGROUND OF THE INVENTION

Field of Invention

The invention relates to a visual interface apparatus and a data transmission system.

Related Art

In recent years, for expanding the application of the consumer electronics, people start to introduce the near field communication (or short range wireless communication) technology in the electronic products. Near field communication (or short range wireless communication) technology can allow the transmission, such as command, music, picture, business card, data or file from an electronic apparatus to another electronic apparatus without establishing a physical circuit connection, so that the electronic apparatus is more favorable for the data transmission. Thus, the electronic apparatus can be more widely applied to, for example, the occasions requiring IC cards, such as access control, tickets, credit cards, or on the occasion of receiving advertising information, such as using Bluetooth to receive the coupon from the screen in the market.

It is an expectable trend for the electronic product to equip with near field communication function. Therefore, it is an active subject for people to develop a new architecture of electronic apparatus with near field communication function.

SUMMARY OF THE INVENTION

An object of the invention is to provide a visual interface apparatus and a data transmission system of a novel structure. The system can process the data for display and the data for transmission and then send them to the display panel of the visual interface apparatus. Thus, images can be displayed by the visual interface apparatus and data or files can also be transmitted to another electronic apparatus through the visual interface apparatus. Besides, by integrating the display data with the transmission data, the system design can be simplified by using a single connecting port.

The invention can be realized by the following techniques.

A visual interface apparatus, working with an operation apparatus, includes an interface module having a display function and a control module. The interface module includes a driving unit and a display panel. The control module transmits a display data and a transmission data to the driving unit, respectively. The driving unit transmits a screen data and a coupling data to the display panel after receiving and processing the data from control module. When the operation apparatus operates on the visual interface apparatus, at least a part of the coupling data is coupled to the operation apparatus from the display panel.

In one embodiment, the display panel displays at least a part of the image of a frame based on the screen data.

In one embodiment, at least one of the image frames displayed by the display panel contains the message that the coupling data is prepared to be coupled to the operation apparatus.

In one embodiment, at least one of the image frames displayed by the display panel contains the result of sending the coupling data to the operation apparatus.

In one embodiment, the control module generates a first label to label the display data and generates a second label to label the transmission data.

In one embodiment, the first label and the second label contain at least a control signal or a formatted tag for data.

In one embodiment, the driving unit identifies the display data and the transmission data according to the first label and the second label, respectively, and generates the corresponding screen data and coupling data.

In one embodiment, the driving unit outputs the screen data according to the display data having the first label and thus makes the display panel displaying at least a part of the image of a frame.

In one embodiment, the driving unit, according to the transmission data having the second label, outputs the coupling data which is coupled to the operation apparatus through at least one electrode of the display panel.

In one embodiment, the electrode is a separate electrode of the display panel or at least one of the plural column electrodes or plural row electrodes of the display panel.

In one embodiment, when the operation apparatus operates on a display surface of the display panel, part of the coupling data is coupled to the operation apparatus from one of the separate electrode, the column electrode, or the row electrodes.

In one embodiment, the display data and the transmission data are transmitted to the driving unit at different moments.

In one embodiment, the driving unit includes two driving circuits, at least one of the driving circuits includes a first shift register and a second shift register, the first shift register processes the screen data and the second shift register processes the coupling data.

In one embodiment, the control module includes at least one central processing unit and a memory.

The invention can be realized by the following technique.

A data transmission system includes an operation apparatus and a visual interface apparatus. The visual interface apparatus includes a control module and an interface module. The interface module includes a driving unit and a display panel. The control module transmits a display data and a transmission data to the driving unit and, after receiving and processing, the driving unit transmits a screen data and a coupling data to the display panel. When the operation apparatus operates on the visual interface apparatus, at least a part of the coupling data is coupled to the operation apparatus from the display panel.

As mentioned above, in the data transmission system and the visual interface apparatus thereof according to the invention, the control module can transmit the display data and the transmission data to the driving unit of the interface module, and the driving unit can transmit the screen data and the coupling data to the display panel of the interface module after receiving and processing the display data and the transmission data. Besides, when the operation apparatus operates on the visual interface apparatus, at least a part of the coupling data can be coupled to the operation apparatus from the display panel. Based on the multiple functions provided, by the interface module, the display data and the transmission data can be integrated, and the whole design can be simplified by using a single connecting port to connect the control module and the interface module. Thereby, the visual interface apparatus not only can display images, but also can transmit the transmission data such as data or files to the operation apparatus through a wireless coupling. Hence, the wireless transmission can be achieved and expand the applications of the visual interface apparatus.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same reference relates to the same element.

Figure 1:
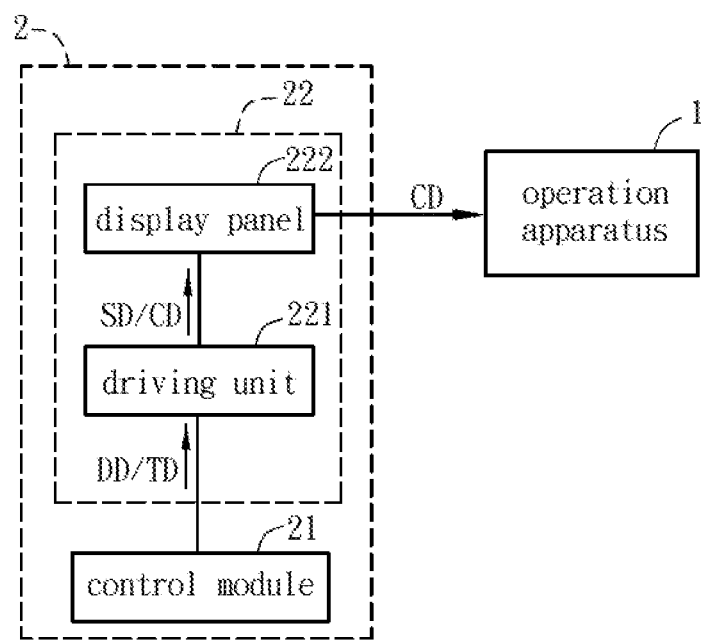
FIG. 1 is a schematic functional block diagram of a data transmission system of a preferred embodiment of the invention.
Figure 2:
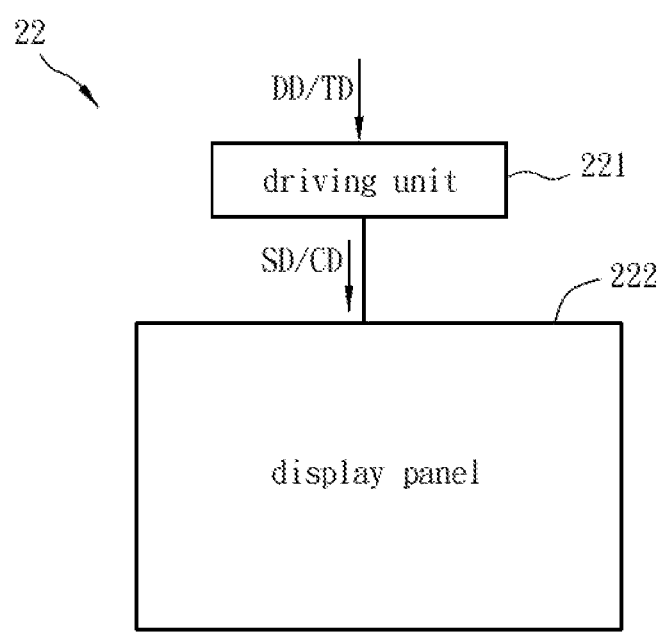
FIG. 2 is a schematic functional block diagram of the interface module in FIG. 1.

FIG. 1 is a schematic functional block diagram of a data transmission system of a preferred embodiment of the invention, and FIG. 2 is a schematic functional block diagram of the interface module 22 in FIG. 1.

As shown in FIG. 1, the data transmission system of the invention includes an operation apparatus 1 and a visual interface apparatus 2. The operation apparatus 1 and the visual interface apparatus 2 are coupled with each other, for example, by electromagnetic coupling (such as capacitive or inductive coupling), and thereby the data or file can be transmitted. So, it's a kind of transmitting data or file without the need of connecting a wire, and it can be thus called a wireless transmission of data or file.

The operation apparatus 1 can be, for example, a receiving apparatus (e.g. a card reader or an access control system), an IC card, another electronic apparatus having a visual interface apparatus, or an electronic apparatus capable of executing other functions. Moreover, the operation apparatus 1 and the visual interface apparatus 2 can both include functional sub-systems, such as a process control system, storage system or transmission system, separately. Herein, the said system can be constructed by hardware, software, firmware or their combination.

The visual interface apparatus 2 includes a control module 21 and an interface module 22. The control module 21 can include a core control assembly of the visual interface apparatus 2, and can include, for example, at least a central processing unit (CPU) and a memory, or other control hardware, software or firmware. The control module 21 can be the main circuit board of a system. Besides, the interface module 22 can include a driving unit 221 and a display panel 222. The driving unit 221 can include a driving circuit for driving the display panel 222, and the display panel 222 can have a pixel matrix, which can be an active matrix or a passive matrix. Herein, the active matrix is taken for an example, and it can be the matrix substrate of an LCD panel, OLED panel, LED panel, electrophoretic display panel, touch display panel, or MEMS display panel, for example.

Figure 3:
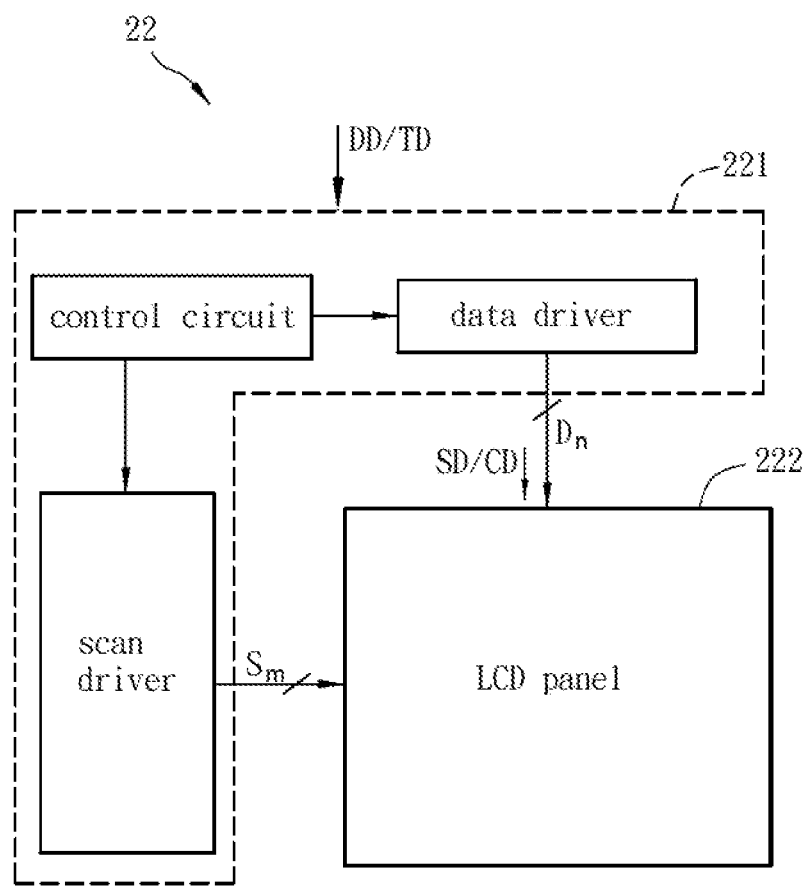
FIG. 3 is a schematic functional block diagram of an embodiment of the interface module.

FIG. 3 is a schematic functional block diagram of an embodiment of the interface module 22. As shown in FIG. 3, herein, for example, the display panel 222 of the interface module 22 is an LCD panel.

In this embodiment, the display panel 222 is an LCD panel, including a plurality of column electrodes, a plurality of row electrodes and a plurality of pixel electrodes, and the column electrodes and the row electrodes can cross each other (not shown). Moreover, the display panel 222 can further include a plurality of transistors (not shown), which are electrically connected with the column electrodes, the row electrodes and the pixel electrodes. Herein for example, the row electrodes are a plurality of scan lines $S_m$ and the column electrodes are a plurality of data lines $D_n$. Of course, the row electrodes can be a plurality of data lines $D_n$ and the column electrodes can be a plurality of scan lines $S_m$.

The control module 21 can transmit a display data DD and a transmission data TD to the driving unit 221, and the driving unit 221 can transmit a screen data SD and a coupling data CD to the display panel 222 after receiving and processing the display data DD and the transmission data TD. The screen data SD and the coupling data CD can contain the information of the display data DD and the transmission data TD, respectively. Moreover, both of the display data DD and the transmission data TD can be generated by an internal or external command of the visual interface apparatus 2, and the origin of data, which are not limited here, can be obtained from the internal memory of the visual interface apparatus 2 or transmitted from an external apparatus. The display data DD can be the gray level data of the image frame displayed by the display panel 222, and the transmission data TD can be a stream of digital data or digital files such as touch information, command information, identification information, transaction information, advertising information, promotion information, file information or other kinds of information. Besides, the data processing executed by driving unit 221 can include, for example, series-to-parallel conversion, encoding, encryption, adding a header (containing size of data, check code, serial number, and route tracking data), transmission beginning label and/or ending label. In comparison with the transmission of a conventional communication, the interface module 22 can use different electrodes of the display panel 222 as the transmitter at the same time (multiple communication channels) for the data transmission. These channels can adopt spatial separation or modulation techniques to reduce the mutual interference and transmit simultaneously. To be noted, the series-to-parallel conversion of the data can be a sequential type or an alternate type or their combination. Herein, the screen data SD and the coupling data CD only represent two kinds of data for different purposes are transmitted to the display panel 222 but don't stand for their signals. By taking an LCD panel as an example, the screen data SD represents two signals, including the scan signal (Y-direction driving) and the data signal (X-direction driving), and the coupling data CD can represent an independent scan signal or data signal, or the scan signal used in the screen data SD, or the data signal used in the screen data SD.

The control module 21 can generate a first label to tag the display data DD and can generate a second label to tag the transmission data TD. In other words, for the driving unit 221 to distinguish the display data DD, as the screen data SD for the display, from the transmission data TD, as the coupling data CD for the transmission, the control module 21 can generate different labels, such as using at least one control signal or at least one formatted tag for data and add them to the display data DD and the transmission data TD. Therefore, the driving unit 221 can recognize from the input data as either the screen data SD for the display or the coupling data CD for the coupling transmission. The driving unit 221 can output the screen data SD according to the display data DD having the first label, so that the display panel 222 displays at least a part of the image of a frame. Besides, according to the transmission data TD having the second label, the driving unit 221 can output the coupling data CD that will be coupled to the operation apparatus 1 from at least an electrode of the display panel 222. The said electrode of the display panel 222 can be a separate electrode (can be a single or multiple electrodes) and located separately outside the pixel matrix of the display panel 222, or can be at least one of the column or row electrodes of the pixel matrix of the display panel 222. When the operation apparatus 1 operates on a display surface of the display panel 222, at least a part of the coupling data CD or entire coupling data CD can be coupled to the operation apparatus 1 from the display panel 222. Herein, the operation of the operation apparatus 1 on the display surface of the display panel 222 means that the operation apparatus 1 approaches or contacts the display surface of the display panel 222. Moreover, a part of the coupling data CD is coupled to the operation apparatus 1 from the said separate electrode or at least one of the column or row electrodes of the display panel 222. Based on the multiple functions, display and data transmission, provided by the interface module 22, the display data DD and the transmission data TD can be integrated and a single connection port can be used to connect the control module 21 with the interface module 22. Thus, the overall design of the visual interface apparatus 2 and the data transmission system can be simplified.

To be noted, besides using the first and second labels to identify the display data DD and the transmission data TD, a time label also can be used for the identification. For example, the control module 21 can constantly transmit the display data DD and the transmission data TD to the driving unit 221 at different moments so that the display data DD and the transmission data TD can be distinguished by the difference in timeline. For example, a protocol between the control module 21 and the driving unit 221 is defined as below: the display data DD is transmitted from the beginning of an image frame till the end of the last scan line (defined as the first time), and the transmission data TD is transmitted from the end of the last scan line till the beginning of the next image frame (defined as the second time); or within the line time of each scan line, the transmission data TD is first transmitted (defined as the first time) and then the display data DD is transmitted (defined as the second time). Thereby, the driving unit 221 can identify which is the screen data SD for display the image and which is the coupling data CD to be transmitted to the operation apparatus 1.

As shown in FIG. 3, the driving unit 221 can include a control circuit and a driving circuit. By taking an LCD panel as an example, the driving circuit includes a data driver and a scan driver, and both of their timing controls are generated by the control circuit. The scan driver is electrically connected to the scan lines $S_m$ of the display panel 222, and the data driver is electrically connected to the data lines $D_n$ of the display panel 222. The control circuit can convert the display data DD received from the peripheral interface to the screen data SD, and can generate the frequency, synchronization signal required for the scan driver and the data driver and also generate the data signal required for each pixel. Since the driving unit 221 for driving the image display is known by those skilled in the art, the description thereof is omitted here for conciseness.

Taking the data line $D_n$ as an example, the data line $D_n$ (the said column electrode) can transmit not only the screen data SD of a conventional image frame but also the coupling data CD. For example, the coupling data CD can be converted into the signal having a frequency higher than the frequency of the screen data SD and directly added on the signal of the screen data SD, or the signal of the coupling data CD can be transmitted within the interval between the signals of the screen data SD. For example, the coupling data CD can be transmitted, when the scanning of the all scan lines $S_m$ is finished and before the scanning of the next frame is started (the blanking time between the consecutive frames), or after the scanning of a certain scan line $S_m$ is completed and before the scanning of the next scan line is started, or within the scan time of each scan lines $S_m$, by shrinking the transmission time of screen data SD and transmitted before the screen data SD.

The coupling data CD also can be transmitted by the scan line $S_m$. For example, the coupling data CD is converted into the signal having levels incapable of turning on the pixel transistor; or the coupling data CD is transmitted through an electrode (e.g. the separate electrode) not belonging to the data line $D_n$ or the scan line $S_m$; or the coupling data CD is transmitted through the data line $D_n$ and the scan line $S_m$ simultaneously for increasing the transmission speed; or the coupling data CD is converted into two signals (e.g. one positive and the other one negative) and then sent to different electrodes (e.g. the data lines or the scan lines) synchronously, and the operation apparatus 1 can restore the coupling data CD by synchronously receiving these two signals to enhance the accuracy of the transmission.

Therefore, the function of the transmission of a part of the coupling data CD can be provided by the control circuit and the driving circuit (including the data driver or the scan driver).

In the conventional art, a shift register of the driving unit 221 is used to convert the serial data into the parallel data. For example, the shift registers of the data drivers are used to convert the input serial pixel data into the data for those n data lines. The data are then outputted simultaneously within the scanning line time. Moreover, the scan driver also use a shift register to shift the output of previous stage to the next stage for achieving the sequential scanning. The above belongs to the known art. In this embodiment, at least one of the data driver and the scan driver can include a first shift register and a second shift register (not shown in the figure). Herein, take for example as the coupling data CD transmitted through the data line $D_n$. When the control circuit receives the display data DD and the transmission data TD and processes them to obtain the screen data SD and the coupling data CD, the screen data SD and the coupling data CD can be, for example, transmitted to a first shift register and a second shift register of the data driver, respectively, so that the first shift register processes the screen data SD and the second shift register processes the coupling data CD. The screen data SD can result in an image displayed by the display panel 222, and the coupling data CD which is transmitted to the electrode of the display panel 222 will be coupled capacitively or inductively to the operation apparatus 1.

When the screen data SD results in multiple image frames displayed by the display panel 222, at least one of the image frames refers to the information that the coupling data CD is going to be coupled to the operation apparatus 1. Moreover, at least one of the image frames refers to the information of the results of coupling CD to the operation apparatus 1. In other words, before the display panel 222 starts to transmit the coupling data CD and after the transmission is finished, the display panel 222 can display indicative images to have the user's attentions. During the transmission period of the display panel 222, the display panel 222 also can mark the electrode region for the transmission in the displayed image so that the user can easily operate the operation apparatus 1 to do the signal coupling.

Herein, the coupling is implemented in a wireless manner to transmit the digital message (i.e. 0 or 1) to the operation apparatus 1 from the visual interface apparatus 2. When the operation apparatus 1 receives the coupling data CD transmitted from the display panel 222, the operation apparatus 1 can apply a backward processing to the received coupling data CD to obtain the transmitted message. The way for operation apparatus to receive the data is by coupling the signal to the operation apparatus 1 through the electromagnetic effect when the operation apparatus 1 approaches or contacts the display panel 222 of the visual interface apparatus 2.

When a part of the coupling data CD is transmitted by such as the column or row electrodes of the pixel matrix, the coupling data CD and the screen data SD of the visual interface apparatus 2 can be transmitted separately at different moments. For example, the coupling data CD is transmitted to the operation apparatus 1 after the end of transmission of a certain image frame or before the start of transmission of a certain image frame. In other words, the visual interface apparatus 2 can transmit the coupling data CD to the operation apparatus 1 after the end of a image frame and before the start of next image frame, or during the period of displaying a image frame. To be noted, when the coupling data CD is transmitted by a separate electrode located outside the pixel matrix, the transmission of the coupling data CD need not operate coordinately with the transmission time of the frame images.

Figure 4:
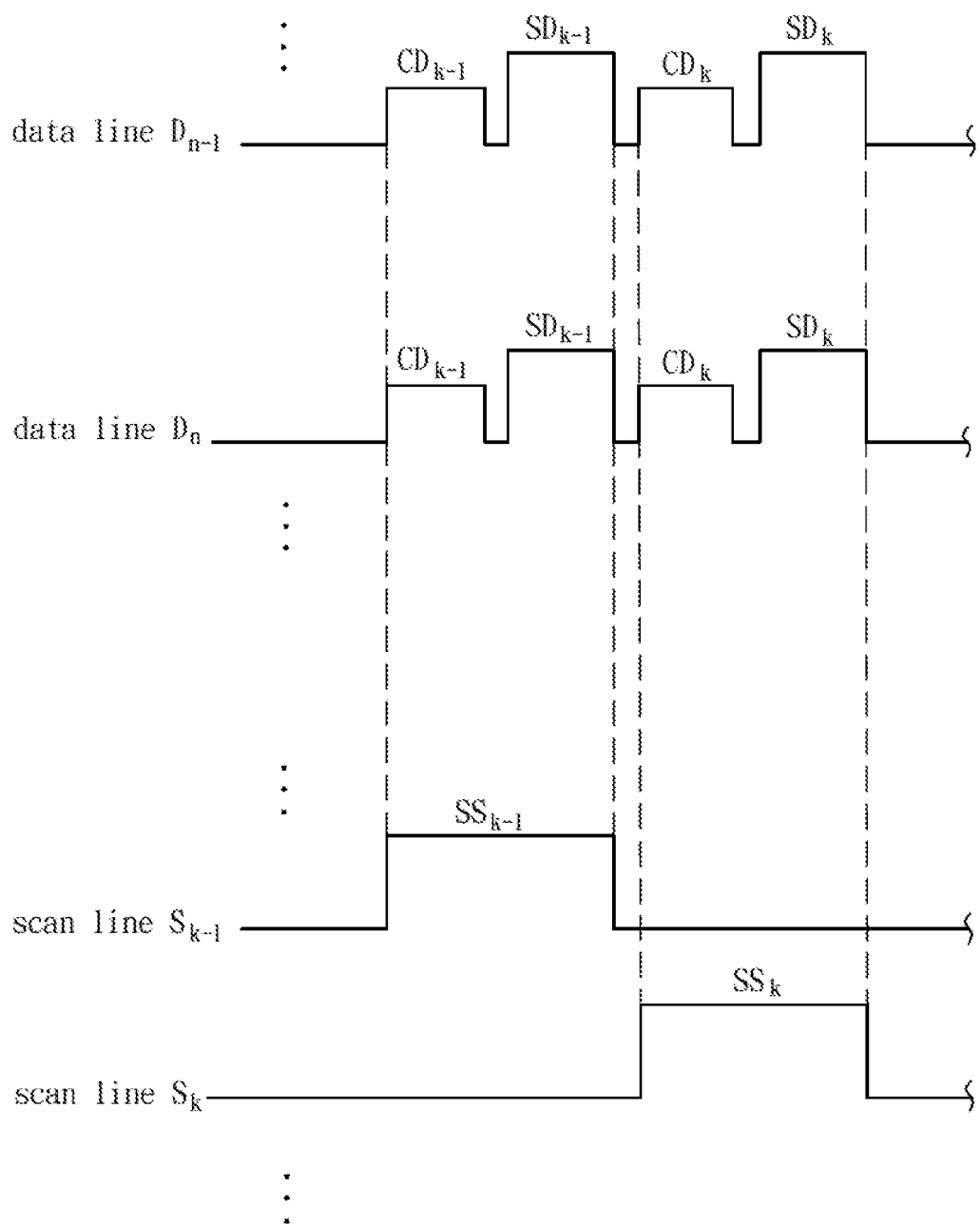
FIG. 4 is a schematic signal diagram of the two adjacent scan lines (column electrodes) and two adjacent data lines (row electrodes) in FIG. 3.

FIG. 4 is a schematic diagram showing the signal of the two adjacent scan lines (row electrodes) and two adjacent data lines (column electrodes) in FIG. 3. As shown in FIGS. 3 and 4, the example is provided by that the transmission of a part of the coupling data CD is implemented when each row of the transistors is turned on for displaying. To be noted, the transistor is turned on or not is not an essential condition. The transmission of the coupling data CD also can be implemented when the transistors are turned off, and, in this case, a part of the coupling data CD can be transmitted by the data lines or scan lines. The scan lines can transmit the scan signal to sequentially turn on each row of the transistors, and when each row of the transistors is turned on, each of the data lines can transmit a part of the coupling data CD and a part of the screen data SD.

In this embodiment, when the scan line $S_{k-1}$ transmits the scan signal $SS_{k-1}$, all the data lines $D_n$ transmit a part of the coupling data $CD_{k-1}$. When the scan line $S_k$ transmits the scan signal $SS_k$, all the data lines $D_n$ transmit a part of the coupling data $CD_k$. In FIG. 4, the parts of the coupling data $CD_{k-1}$, $CD_k$ are indicated by different voltage levels to distinguish from the screen data SDk-1, $SD_k$, but they may have the same voltage level in other embodiments. Therefore, when the scan line $S_m$ transmits the scan signal, the data lines $D_n$ can transmit the coupling data CD so that at least a part of the coupling data CD can be coupled to the operation apparatus 1.

To be noted, a part of the coupling data $CD_k$, $CD_{k-1}$ in FIG. 4 is shown with high level of "1", but it's just for illustrative purpose, and certainly the low level of "0" also can be used. Moreover, in order to avoid the occurrence of the signal polarity issue, the coupling data $CD_k$, $CD_{k-1}$ can use an AC signal without DC component. Besides, the coupling data $CD_k$, $CD_{k-1}$ can contain one-bit data or multi-bit data, and this invention is not limited thereto. Although all the data lines $D_n$ transmit the same part of the coupling data $CD_k$, $CD_{k-1}$ within the same frame time, each of the data lines also can transmit different part of the coupling data. Moreover, several data lines can be grouped to transmit the same part of the coupling data. For example, the data lines $D_1 \sim D_3$ all transmit the first part of the coupling data $CD_1$, and the data lines $D_4 \sim D_6$ all transmit the second part of the coupling data $CD_2$. The same principle also can be applied to the part of the coupling data transmitted by the scan lines. Besides, to ensure the correct transmission of coupling data CD, the same part of the coupling data CD can be transmitted repeatedly at different moments. In other words, if an abnormal case occurs, the same part of the coupling data CD can be transmitted again in order to assure the correctness of the data received by the operation apparatus 1.

The above-mentioned method is the amplitude modulation technique which signals, with different amplitudes, are used to represent the digit "1" or "0". The frequency modulation technique also can be used to represent "1" or "0". For example, defines "1" as 5 cycles of high-to-low change in amplitude within a unit time and the rest as "0". Or, the phase shift modulation can be used, which, for example, defines a high level followed by a low level as "0" and a low level followed by a high level as "1". The type of the modulation technique is not limited herein. Moreover, in order to avoid the interference between the adjacent electrodes, the time-division multiplexing, frequency-division multiplexing, or code-division multiplexing can be used for the different electrodes.

Accordingly, when the user takes and operates the operation apparatus 1 on the display panel 222 of the visual interface apparatus 2 (such as contacting or approaching the display panel 222), the coupling data CD can be coupled to the operation apparatus 1 from the display surface of the display panel 222 through the capacitive or inductive coupling. Because the coupling data CD is transmitted by the data line in this embodiment, each of the data lines acts as one of the electrodes for the capacitive coupling and the operation apparatus 1 has another electrode for the capacitive coupling. After the operation apparatus 1 receives all the parts of the coupling data CD through the capacitive coupling, the operation apparatus 1 can assemble all the received parts of the coupling data CD to obtain the complete coupling data CD, which can be a document, a picture file or a video file for example. For example, when the operation apparatus 1 is an access control unit, by moving the display surface of the visual interface apparatus 2 to approach the operation apparatus 1, the operation apparatus 1 can receive the open-door or lock-door message transmitted by the visual interface apparatus 2, and thereby the lock can be removed or applied. When the visual interface apparatus 2 is a public display and the operation apparatus 1 is a cell phone or another personal apparatus, by moving the operation apparatus 1 to approach the display surface of the visual interface apparatus 2, the message such as advertising information, promotion information, geographical information can be transmitted to the personal apparatus and taken by the user.

In summary, in the data transmission system and the visual interface apparatus thereof according to the invention, the control module can transmit the display data and the transmission data to the driving unit of the interface module, and the driving unit can transmit the screen data and the coupling data to the display panel of the interface module after receiving and processing the display data and the transmission data. Besides, when the operation apparatus operates on the visual interface apparatus, at least a part of the coupling data can be coupled to the operation apparatus from the display panel. Thereby, the visual interface apparatus not only can display images, but also can transmit the transmission data such as data or files to the operation apparatus in a wireless coupling manner. Hence, by integrating the display data and the transmission data, the connection between the interface module and the control module can be simplified, and besides the transmission function of the wireless connection can be achieved so that the application of the visual interface apparatus can be expanded.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A visual interface apparatus working with an operation apparatus, and comprising:
   an interface module including a driving unit and a display panel, wherein the display panel includes a display matrix, the display matrix includes plural column electrodes and row electrodes; and
   a hardware processing unit transmitting a display data and a transmission data to the driving unit, wherein the driving unit, after receiving and processing the display data and transmission data, transmits a screen data for image display and a coupling data for signal transmission to at least one of the column electrodes and the row electrodes of the display matrix of the display panel,
   wherein when the operation apparatus operates on the visual interface apparatus, at least a part of the coupling data is wirelessly and directly coupled to the operation apparatus from the at least one of the column electrodes and the row electrodes of the display matrix of the display panel.

2. The visual interface apparatus as recited in claim 1, wherein the display panel, based on the screen data, displays at least a part of an image of an image frame.

3. The visual interface apparatus as recited in claim 1, wherein the hardware processing unit generates a first label to tag the display data and generates a second label to tag the transmission data.

4. The visual interface apparatus as recited in claim 3, wherein the first label and the second label contain at least a control signal or a formatted tag for data.

5. The visual interface apparatus as recited in claim 3, wherein the driving unit identifies the display data and the transmission data according to the first label and the second label, respectively, and generates the corresponding screen data and coupling data.

6. The visual interface apparatus as recited in claim 3, wherein the driving unit outputs the screen data according to the display data having the first label and makes the display panel display at least a part of an image of an image frame.

7. The visual interface apparatus as recited in claim 3, wherein the driving unit, according to the transmission data having the second label, outputs the coupling data which will be wirelessly coupled to the operation apparatus through at least one electrode of the column electrodes or the row electrodes of the display matrix of the display panel.

8. The visual interface apparatus as recited in claim 1, wherein the display data and the transmission data are transmitted to the driving unit at different moments, respectively.

9. The visual interface apparatus as recited in claim 1, wherein the driving unit includes two driving circuits, at least one of the driving circuits includes a first shift register and a second shift register, the first shift register processes the screen data and the second shift register processes the coupling data.

10. A data transmission system, comprising:
    an operation apparatus; and
    a visual interface apparatus including a hardware processing unit and an interface module, wherein the interface module includes a driving unit and a display panel, the display panel includes a display matrix, the display matrix includes plural column electrodes and row electrodes, the hardware processing unit transmits a display data and a transmission data to the driving unit, and the driving unit, after receiving and processing the display data and transmission data, transmits a screen data for image display and a coupling data for signal transmission to at least one of the column electrodes and the row electrodes of the display matrix of the display panel,
    wherein when the operation apparatus operates on the visual interface apparatus, at least a part of the coupling data is wirelessly and directly coupled to the operation apparatus from the at least one of the column electrodes and the row electrodes of the display matrix of the display panel.

11. The data transmission system as recited in claim 10, wherein the display panel, based on the screen data, displays at least a part of an image of an image frame.

12. The data transmission system as recited in claim 10, wherein the hardware processing unit generates a first label to tag the display data and generates a second label to tag the transmission data.

13. The data transmission system as recited in claim 12, wherein the first label and the second label contain at least a control signal or a formatted tag for data.

14. The data transmission system as recited in claim 12, wherein the driving unit identifies the display data and the transmission data according to the first label and the second label, respectively, and generates the corresponding screen data and coupling data.

15. The data transmission system as recited in claim 12, wherein the driving unit outputs the screen data according to the display data having the first label and makes the display panel display at least a part of an image of an image frame.

16. The data transmission system as recited in claim 12, wherein the driving unit, according to the transmission data having the second label, outputs the coupling data which will be wirelessly coupled to the operation apparatus through at least one electrode of the column electrodes or the row electrodes of the display matrix of the display panel.

17. The data transmission system as recited in claim 10, wherein the display data and the transmission data are transmitted to the driving unit at different moments, respectively.

18. The data transmission system as recited in claim 10, wherein the driving unit includes two driving circuits, at least one of the driving circuits includes a first shift register and a second shift register, the first shift register processes the screen data and the second shift register processes the coupling data.

* * * * *